US012728397B2

(12) United States Patent
Pierce et al.

(10) Patent No.: US 12,728,397 B2
(45) Date of Patent: Sep. 8, 2026

(54) SYSTEMS FOR LOCATING A MOTOR IN STAND MIXERS

(71) Applicant: Haier US Appliance Solutions, Inc., Wilmington, DE (US)

(72) Inventors: Andrew Pierce, Louisville, KY (US); Edward Simeon Chupka, Bardstown, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 967 days.

(21) Appl. No.: 17/899,976

(22) Filed: Aug. 31, 2022

(65) Prior Publication Data

US 2024/0066482 A1 Feb. 29, 2024

(51) Int. Cl.
*B01F 35/32* (2022.01)
*B01F 35/31* (2022.01)

(52) U.S. Cl.
CPC .......... *B01F 35/3204* (2022.01); *B01F 35/31* (2022.01); *B01F 35/3214* (2022.01); *B01F 35/323* (2022.01)

(58) Field of Classification Search
CPC .. B01F 35/3204; B01F 35/31; B01F 35/3214; B01F 35/323; A47J 43/044; A47J 43/0705; A47J 2043/04454
See application file for complete search history.

(56) References Cited

U.S. PATENT DOCUMENTS

| | | | | | |
|---|---|---|---|---|---|
| 2,564,887 | A * | 8/1951 | Ernst | A47J 43/044 | 366/206 |
| 3,198,490 | A * | 8/1965 | Jepson | A47J 43/044 | 366/344 |
| 4,351,612 | A * | 9/1982 | Valbona | A47J 43/044 | 366/206 |
| 4,382,200 | A * | 5/1983 | Street | H02K 5/00 | 310/91 |
| 5,653,535 | A * | 8/1997 | Xie | A21C 1/14 | 366/100 |
| 8,066,426 | B2 * | 11/2011 | Sandford | A47J 43/046 | 366/205 |
| 9,167,938 | B2 | 10/2015 | Benoit et al. | | |
| 10,517,439 | B2 | 12/2019 | Jays et al. | | |
| 10,986,964 | B2 | 4/2021 | Eikelenberg et al. | | |
| 2022/0297069 | A1 * | 9/2022 | Christiansen | B01F 31/70 | |

FOREIGN PATENT DOCUMENTS

| | | | | | |
|---|---|---|---|---|---|
| CN | 204016058 | U | | 12/2014 | |
| CN | 209883908 | U | | 1/2020 | |
| FR | 2825607 | A1 | * | 12/2002 | A47J 43/044 |
| GB | 2598709 | A | | 3/2022 | |

* cited by examiner

*Primary Examiner* — Marc C Howell
(74) *Attorney, Agent, or Firm* — Dority & Manning, P.A.

(57) ABSTRACT

A stand mixer appliance includes a casing that includes a base, a column mounted to the base, and a motor housing mounted to the column that extends outwardly above the base. A motor is positioned within the motor housing. The motor includes two pins. The motor housing includes a first portion and a second portion. The second portion includes both a hole and a slot. The slot is elongated along a transverse direction of the motor, and the two pins of the motor extend perpendicularly to the transverse direction. Each of the two pins of the motor are disposed within a respective one of the hole and the slot of the second portion of the motor housing.

18 Claims, 4 Drawing Sheets

SYSTEMS FOR LOCATING A MOTOR IN STAND MIXERS

FIELD OF THE INVENTION

The present subject matter relates generally to locating systems in stand mixers, particularly for locating a motor.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. In stand mixers, the housing for the motor is conventionally created in two parts for assembly. Critical to the function and craftsmanship of the stand mixer, all output shafts need to be concentric with openings in the housing for the motor. In current practice, holes and pins and patterns of fasteners are used to locate the motor in the housing, which can require precise tooling, part checking, or oversized holes resulting in increased costs as well as variation and misalignment of the motor.

BRIEF DESCRIPTION OF THE INVENTION

Aspects and advantages of the invention will be set forth in part in the following description, or may be apparent from the description, or may be learned through practice of the invention.

In one example embodiment, a stand mixer appliance includes a casing that includes a base, a column mounted to the base, and a motor housing mounted to the column that extends outwardly above the base. A motor is positioned within the motor housing. The motor includes two pins. The motor housing includes a first portion and a second portion. The second portion includes both a hole and a slot. The slot is elongated along a transverse direction of the motor, and the two pins of the motor extend perpendicularly to the transverse direction. Each of the two pins of the motor are disposed within a respective one of the hole and the slot of the second portion of the motor housing.

In another example embodiment, a stand mixer appliance includes a casing that includes a base, a column mounted to the base, and a motor housing mounted to the column that extends outwardly above the base. A motor is positioned within the motor housing. The motor includes two pins. A horizontal output shaft is rotatable by the motor relative to the motor housing. The motor housing includes a first portion and a second portion. The second portion includes both a hole and a slot. The slot is elongated along a transverse direction of the motor. Each of the two pins of the motor extend perpendicularly to the transverse direction into a respective one of the hole and the slot of the second portion of the motor housing.

In another example embodiment, a stand mixer appliance includes a casing that includes a base, a column mounted to the base, and a motor housing mounted to the column that extends outwardly above the base. A motor is positioned within the motor housing. The motor includes at least two pins. A horizontal output shaft is rotatable by the motor relative to the motor housing. The motor housing includes a first portion and a second portion. The second portion includes at least one hole and at least one slot. The at least one slot is elongated along a transverse direction of the motor. The at least two pins of the motor extend perpendicularly to the transverse direction. Each of the at least two pins of the motor are received within a respective one of the at least one hole and the at least one slot of the second portion of the motor housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
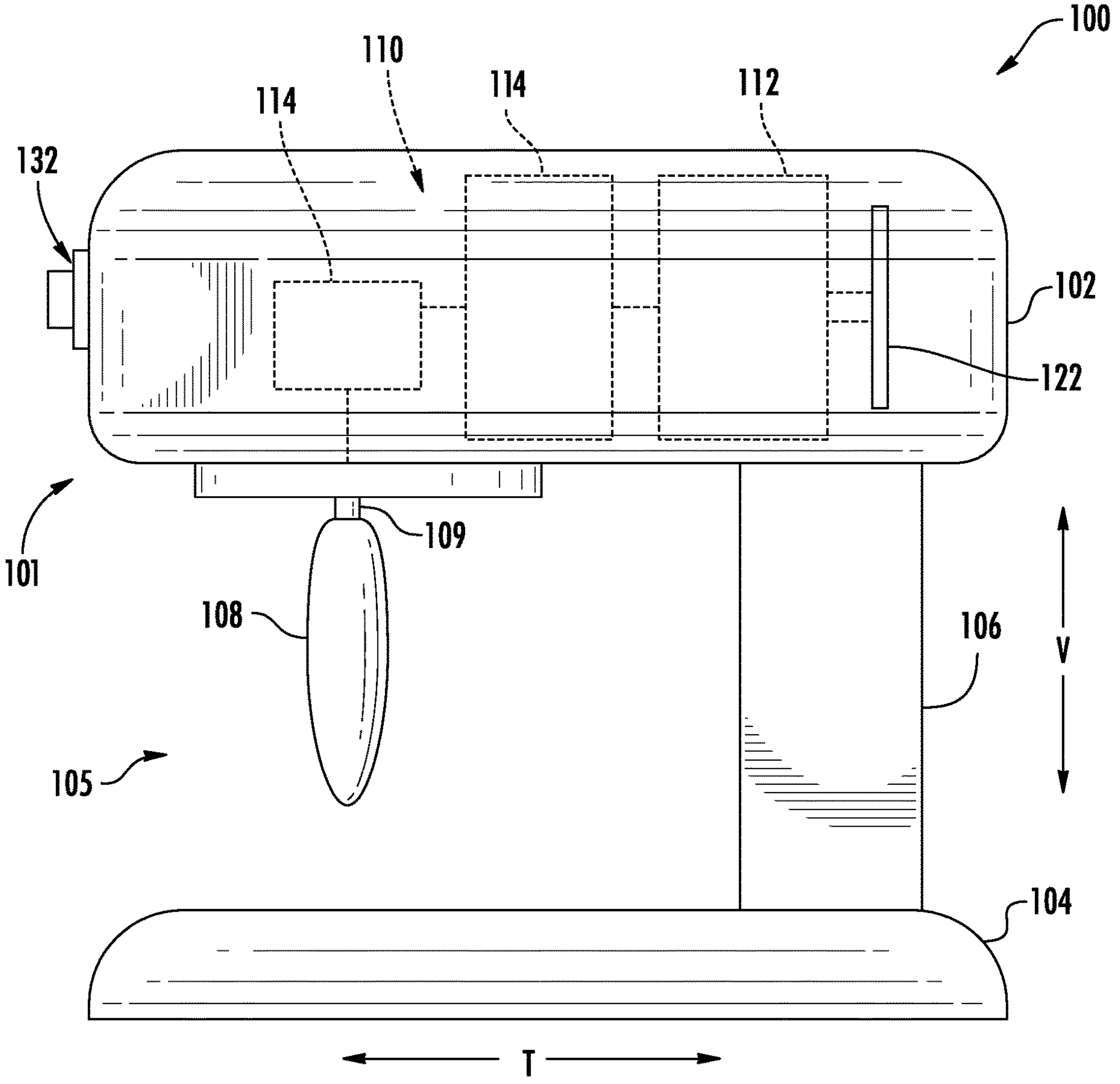
FIG. 1 illustrates a side section view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “includes” and “including” are intended to be inclusive in a manner similar to the term “comprising.” Similarly, the term “or” is generally intended to be inclusive (i.e., “A or B” is intended to mean “A or B or both”). Approximating language, as used herein throughout the specification and claims, is applied to modify any quantitative representation that could permissibly vary without resulting in a change in the basic function to which it is related. Accordingly, a value modified by a term or terms, such as “about,” “approximately,” and “substantially,” are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. An opening 132 for a horizontal output shaft 130 (FIG. 3) may align with the rotational axis of motor 112. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
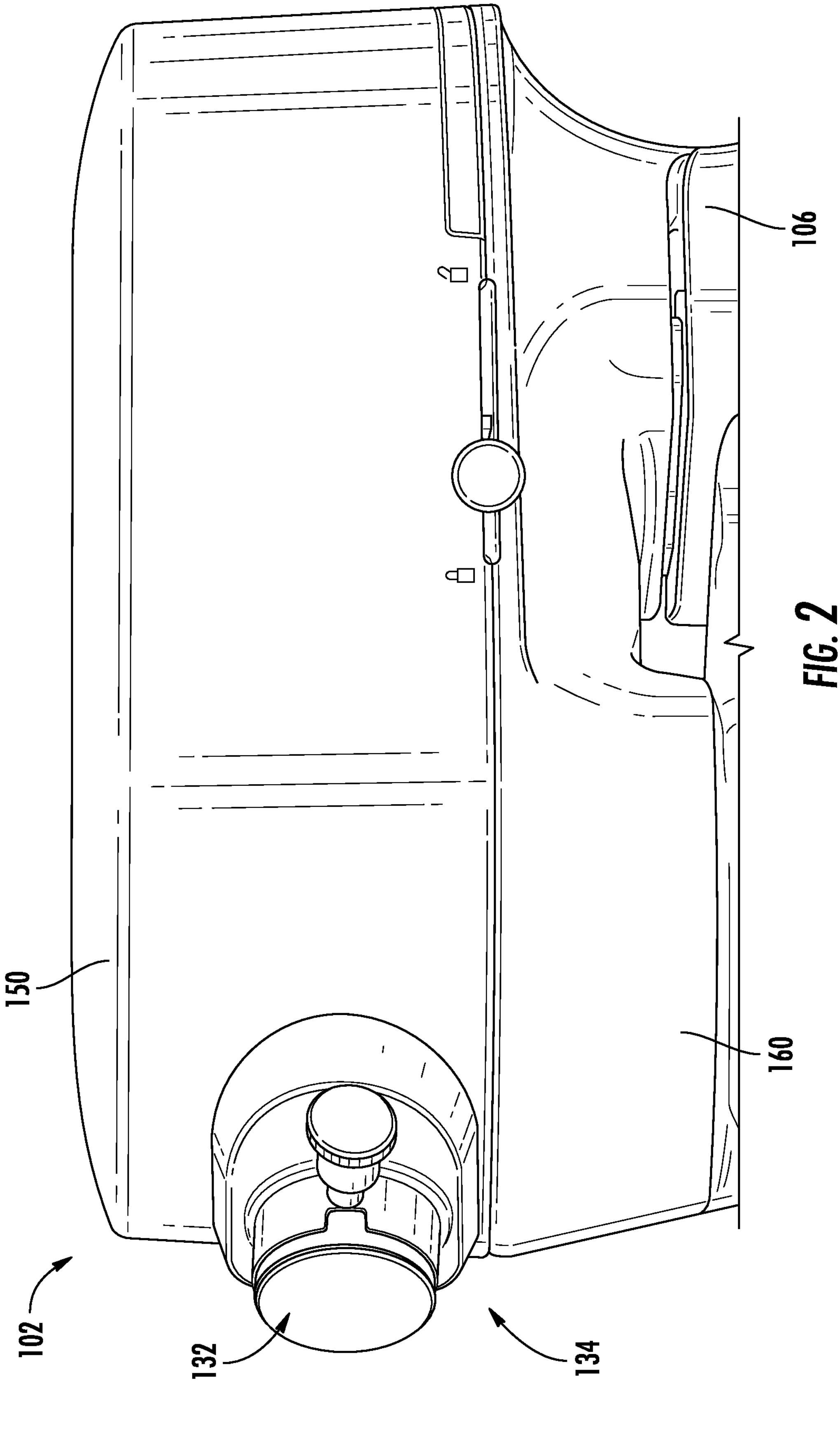
FIG. 2 illustrates a perspective view of a motor housing of the example stand mixer of FIG. 1.

FIG. 2 illustrates a perspective view of motor housing 102. As shown, motor housing 102 may include a first portion 150 and a second portion 160. Thus, e.g., motor housing 102 may include a two-piece structure that collectively forms motor housing 102. Moreover, first portion 150 may couple to second portion 160 to form motor housing 102. Second portion 160 may be mounted, e.g., pivotally, to column 106. As stated above, an opening 132 for a horizontal output shaft 130 (FIG. 3) may be defined by motor housing 102. Opening 132 may be positioned on a front portion 134 of motor housing 102 for easy access for an operator.

Figure 3:
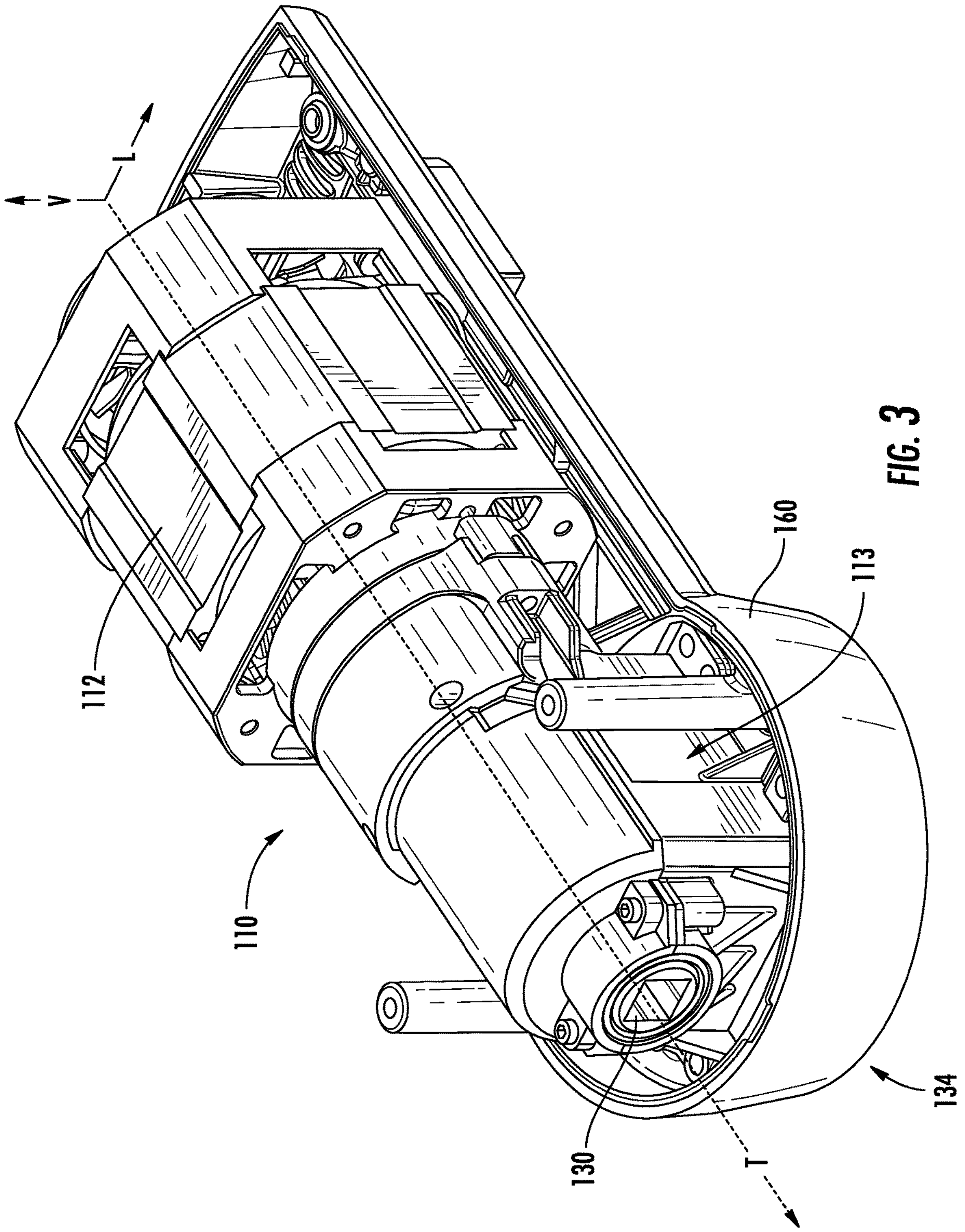
FIG. 3 illustrates a perspective view of a motor in the motor housing of FIG. 2.

FIG. 3 illustrates second portion 160 of motor housing 102 with motor 112 and a motor assembly 113 shown. Motor assembly 113 may include components of drivetrain 110, e.g., planetary gearbox 114, bevel gearbox 116, and horizontal output shaft 130. Motor assembly 113 may be mounted within second portion 160 such that the axis of rotation of the motor is axially aligned with the transverse direction T. Additionally, motor assembly 113 may be mounted within second portion 160 such that horizontal output shaft 130 is positioned proximate front portion 134.

Figure 4:
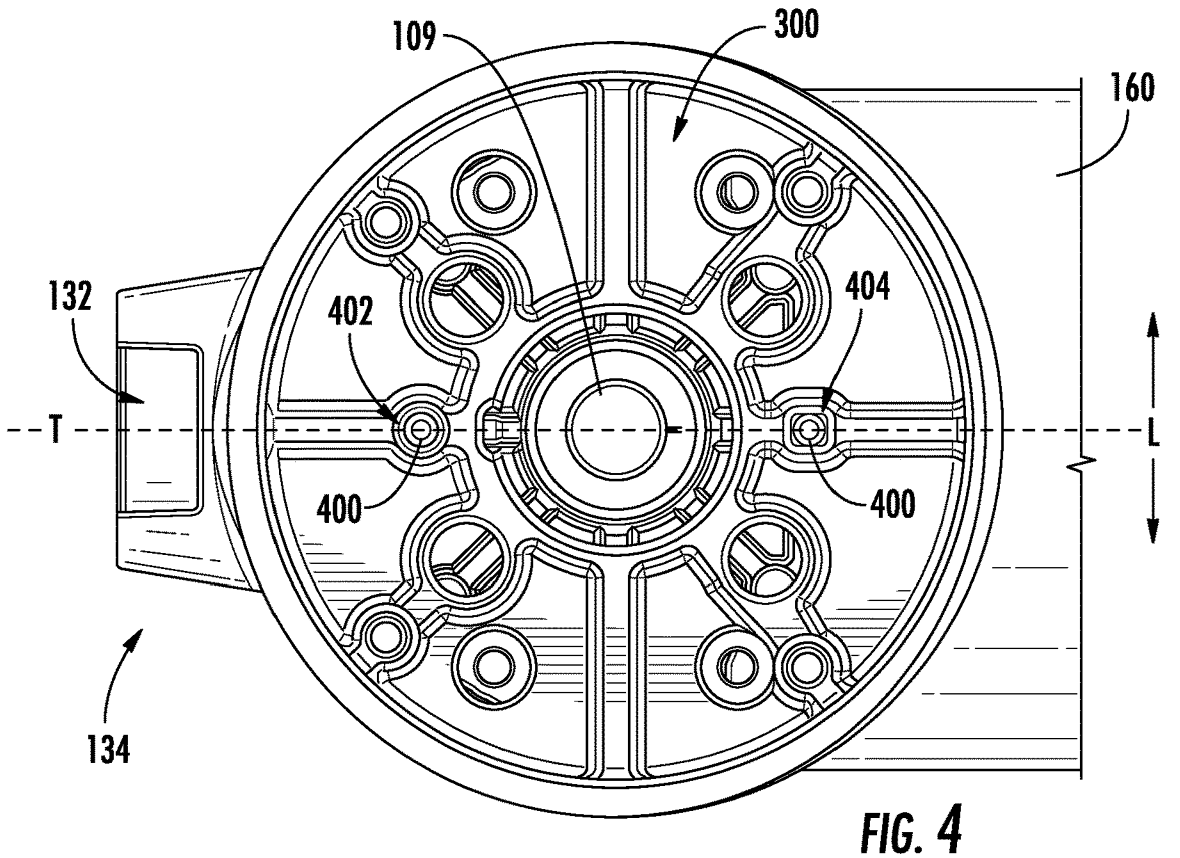
FIG. 4 illustrates a bottom perspective view of a portion of the motor housing of FIG. 2.

FIG. 4 illustrates a perspective view of a bottom portion 300 of second portion 160 above mixing zone 105. Pins 400 may extend from motor assembly 113, e.g., from a portion of motor assembly 113 housing bevel gearbox 116. Pins 400 may be spaced apart, e.g., along the transverse direction T, on motor assembly 113. In example embodiments, pins 400 may be positioned about equidistant from the rotational axis of mixer shaft 109. In the illustrated example embodiment of FIG. 4, motor assembly 113 includes two pins 400; however, in alternative example embodiments, motor assembly 113 may include more than two pins 400, e.g., three (3) pins, four (4) pins, five (5) pins, or more. Pins 400 may be spaced at least two centimeters (2 cm) apart for increased motor 112 stability than a scenario with pins 400 closer than two centimeters (2 cm). Pins 400 may extend in the vertical direction V from motor assembly 113, e.g., perpendicular to both the transverse direction T and the lateral direction L. The pins 400 may be shaped as cylindrical pins, tapered pins, or rounded pins in certain example embodiments.

Referring still to FIG. 4, second portion 160 of motor housing 102 may have a hole 402 and a slot 404 positioned at bottom portion 300. Hole 402 and slot 404 may be spaced apart, e.g., along the transverse direction T, on second portion 160 of motor housing 102. In example embodiments. hole 402 and slot 404 may be positioned about equidistant from the rotational axis of mixer shaft 109. Hole 402 may be positioned closer to front portion 134 than slot 404, e.g., along the transverse direction T. In the illustrated example embodiment of FIG. 4, motor assembly 113 includes one (1) hole 402 and one (1) slot 404; however, in alternative example embodiments, motor assembly 113 may include more than one hole 402 and more than one slot 404, e.g., two (2) holes 402 and two (2) slots 404. Hole 402 and slot 404 may be spaced at least two centimeters (2 cm) apart for increased motor 112 stability than a scenario with hole 402 and slot 404 closer than two centimeters (2 cm).

Pins 400 may be configured to engage with hole 402 and slot 404 in order to locate motor 112 in second portion 160. Pins 400 engaging with hole 402 and slot 404 act as four-way (4-way) and two-way (2-way) locators, e.g., the four-way (4-way) locators preventing rotation and translation and two-way (2-way) locators preventing rotation. In the illustrated example embodiment of FIG. 4, the pin 400 engaging in hole 402 is the four-way (4-way) locator, e.g., and thus restrains rotation and translation in a horizontal plane of motor 112 relative to second portion 160. The pin 400 engaging in slot 404 is the two-way (2-way) locator, e.g., and thus restrains rotation in the horizontal plane of motor 112 relative to second portion 160. Thus, locating motor assembly 113 to second portion 160 with pins 400 engaging in hole 402 and slot 404 may advantageously properly align horizontal output shaft 130 of motor assembly 113 with opening 132. Additionally, locating motor assembly 113 to second portion 160 with pins 400 engaging in hole 402 and slot 404 may advantageously properly align mixer shaft 109.

Figure 5:
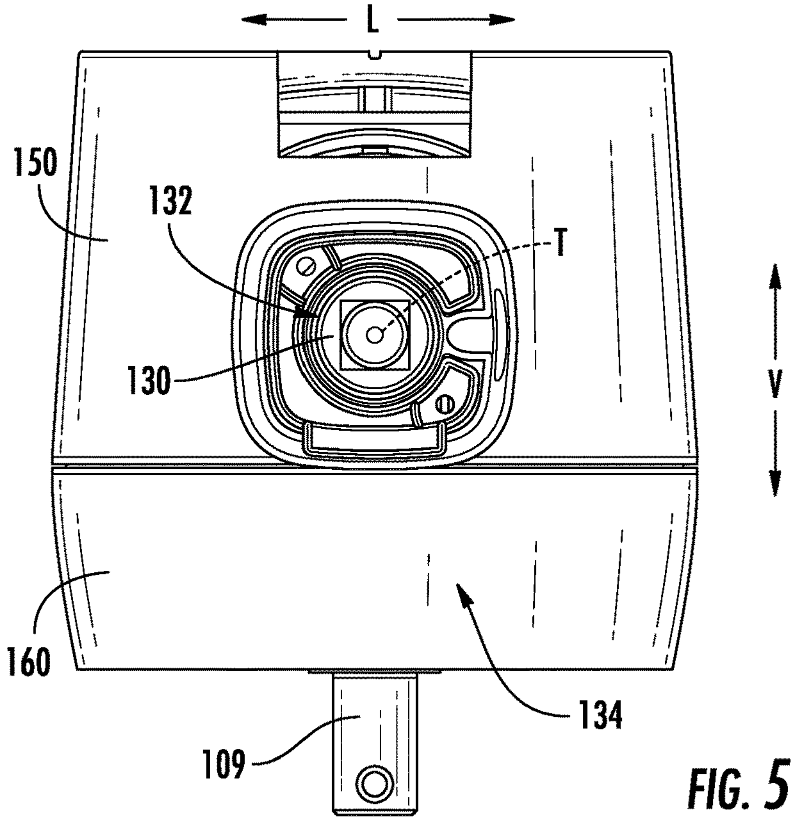
FIG. 5 illustrates a front perspective view of the motor housing of FIG. 2.

As illustrated in FIG. 5, with pins 400 engaging with hole 402 and slot 404, horizontal output shaft 130 of motor assembly 113 may align with opening 132 for easy access by an operator. Ensuring horizontal output shaft 130 is concentric, with respect the transverse direction T, with opening 132 of motor housing 102 ensures that a wide range of accessories may be attached to stand mixer 100, including attachments from different manufactures. Ensuring that hole 402 and slot 404 are in line, with respect to the transverse direction T, with horizontal output shaft 130 reduces the number of variations in hole/slot placement that may affect the alignment of horizontal output shaft 130 and opening 132.

For example, if two holes are used, instead of hole 402 and slot 404, the angular offset, the distance between them, and the location relative to the center line may all affect the alignment. The hole 402 and slot 404 arrangement removes the variation from distance between the features and reduces the geometric leverage by positioning the two-way (2-way) locator, e.g., slot 404, farther away from the four-way (4-way) locator, e.g., hole 402, than horizontal output shaft 130, while in line with respect to the transverse direction T. In other words, along the transverse direction T, the distance between hole 402 and slot 404 may be larger than the distance between hole 402 and horizontal output shaft 130.

As may be seen from the above, the use of locating features, such as pins 400 with hole 402 and slot 404 may locate motor 112 in motor housing 102 such that horizontal output shaft 130 is properly aligned with opening 132. When horizontal output shaft 130 is concentric, with respect the transverse direction, with opening 132 of motor housing 102, a wide range of accessories may be attached to stand mixer 100. The wide range of accessories may include attachments from different manufactures. In addition, pins 400 engaging with hole 402 and slot 404 may ease the assembly of stand mixer 100, e.g., as a result of positively aligning horizontal output shaft 130 to opening 132 each time. Further, results of the proper alignment of horizontal output shaft 130 to opening 132 may be improved craftsmanship, increased performance, and reduced assembly problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer appliance defining a mutually perpendicular vertical direction, a lateral direction, and a transverse direction, the stand mixer appliance comprising:

a casing that comprises a base, a column mounted to the base, and a motor housing mounted to the column and extending outwardly above the base;

a motor positioned within the motor housing, the motor comprising two pins, wherein the two pins comprises a first pin and a second pin; and a mixer shaft positioned on the motor housing, wherein the motor housing comprises a first portion and a second portion, the second portion comprising both a hole and a slot, the hole and the slot positioned in-line with respect to the transverse direction, the slot elongated along the transverse direction of the motor, the two pins of the motor extending perpendicular to the transverse direction, the first pin of the two pins of the motor disposed within the hole and the second pin of the two pins of the motor disposed within the slot of the second portion of the motor housing, wherein the first pin engaging in the hole is a four-way locator and the second pin engaging the slot is a two-way locator, whereby the mixer shaft is aligned on the motor housing with respect to a plane perpendicular to the vertical direction.

2. The stand mixer of claim 1, wherein the first pin of the two pins of the motor in the hole of the second portion restrains rotation and translation of the motor relative to the second portion in the plane perpendicular to the vertical direction.

3. The stand mixer of claim 1, wherein the second pin of the two pins of the motor in the slot of the second portion restrains rotation of the motor relative to the second portion in the plane perpendicular to the vertical direction.

4. The stand mixer of claim 1, further comprising a horizontal output shaft rotatably mounted to the motor housing, the two pins of the motor disposed within the hole and the slot of the second portion arranged and oriented to align the motor with the horizontal output shaft.

5. The stand mixer of claim 1, wherein the hole is disposed no less than two centimeters from the slot in the transverse direction.

6. The stand mixer of claim 1, wherein the two pins are one of cylindrical pins, tapered pins, and rounded pins.

7. A stand mixer appliance defining a mutually perpendicular vertical direction, a lateral direction, and a transverse direction, the stand mixer appliance comprising:

a casing that comprises a base, a column mounted to the base, and a motor housing mounted to the column and extending outwardly above the base;

a motor positioned within the motor housing, the motor comprising two pins, wherein the two pins comprises a first pin and a second pin;

a mixer shaft positioned on the motor housing; and a horizontal output shaft rotatable by the motor relative to the motor housing, wherein the motor housing comprises a first portion and a second portion, the second portion comprising both a hole and a slot, the hole and the slot positioned in-line with respect to the transverse direction, the slot elongated along the transverse direction of the motor, the two pins of the motor extending perpendicular to the transverse direction, the first pin of the two pins of the motor disposed within the hole and the second pin of the two pins of the motor disposed within the slot of the second portion of the motor housing, wherein the first pin engaging in the hole is a four-way locator and the second pin engaging the slot is a two-way locator, whereby the mixer shaft is aligned on the motor housing with respect to a plane perpendicular to the vertical direction.

8. The stand mixer of claim 7, wherein the first pin of the two pins of the motor in the hole of the second portion restrains rotation and translation of the motor relative to the second portion in the plane perpendicular to the vertical direction.

9. The stand mixer of claim 7, wherein the second pin of the two pins of the motor in the slot of the second portion restrains rotation of the motor relative to the second portion in the plane perpendicular to the vertical direction.

10. The stand mixer of claim 7, wherein the two pins of the motor disposed within the hole and the slot of the second portion arranged and oriented to align the motor with the horizontal output shaft.

11. The stand mixer of claim 7, wherein the hole is disposed no less than two centimeters from the slot in the transverse direction.

12. The stand mixer of claim 7, wherein the two pins are one of cylindrical pins, tapered pins, and rounded pins.

13. A stand mixer appliance defining a mutually perpendicular vertical direction, a lateral direction, and a transverse direction, the stand mixer appliance comprising:

a casing that comprises a base, a column mounted to the base, and a motor housing mounted to the column and extending outwardly above the base;

a motor mounted within the motor housing, the motor comprising at least two pins, wherein the at least two pins comprises a first pin and a second pin;

a mixer shaft positioned on the motor housing; and a horizontal output shaft rotatably mounted to the motor housing, wherein the motor housing comprises a first portion and a second portion, the second portion comprising at least one hole and at least one slot, the at least one hole and the at least one slot positioned in-line with respect to the transverse direction, the at least one slot elongated along the transverse direction of the motor, the at least two pins of the motor extending perpendicular to the transverse direction, the first pin of the at least two pins of the motor received within the at least one hole and the second pin of the at least two pins of the motor disposed within the at least one slot of the second portion of the motor housing, wherein the first pin engaging in the hole is a four-way locator and the second pin engaging the slot is a two-way locator, whereby the mixer shaft is aligned on the motor housing with respect to a plane perpendicular to the vertical direction.

14. The stand mixer of claim 13, wherein the first pin of the at least two pins of the motor in the hole of the second portion restrains rotation and translation of the motor relative to the second portion in the plane perpendicular to the vertical direction.

15. The stand mixer of claim 13, wherein the second pin of the at least two pins of the motor in the slot of the second portion restrains rotation of the motor relative to the second portion in the plane perpendicular to the vertical direction.

16. The stand mixer of claim 13, wherein the two pins of the motor disposed within the hole and the slot of the second portion arranged and oriented to align the motor with the horizontal output shaft.

17. The stand mixer of claim 13, wherein the hole is disposed no less than two centimeters from the slot in the transverse direction.

18. The stand mixer of claim 13, wherein the two pins are one of cylindrical pins, tapered pins, and rounded pins.

* * * * *